(12) United States Patent
Riley

(10) Patent No.: US 11,227,034 B2
(45) Date of Patent: Jan. 18, 2022

(54) SYSTEM, METHOD, AND APPARATUS FOR ASSISTING WITH PASSWORDS

(71) Applicant: PC Matic, Inc., Sioux City, IA (US)

(72) Inventor: Matthew Quincy Riley, Owosso, MI (US)

(73) Assignee: PC MATIC, INC., Sioux City, IA (US)

( * ) Notice: Subject to any disclaimer, the term of this patent is extended or adjusted under 35 U.S.C. 154(b) by 186 days.

(21) Appl. No.: 16/752,740

(22) Filed: Jan. 27, 2020

(65) Prior Publication Data

US 2021/0232663 A1 Jul. 29, 2021

(51) Int. Cl.
*G06F 21/31* (2013.01)
*G06F 21/46* (2013.01)

(52) U.S. Cl.
CPC .............. *G06F 21/31* (2013.01); *G06F 21/46* (2013.01)

(58) Field of Classification Search
CPC ................................. G06F 21/31; G06F 21/46
See application file for complete search history.

(56) References Cited

U.S. PATENT DOCUMENTS

| | | | |
|---|---|---|---|
| 9,660,980 B1 * | 5/2017 | Rashidi ................. H04L 63/083 |
| 9,977,893 B1 * | 5/2018 | Jancula .................... G06F 21/46 |
| 10,331,879 B1 * | 6/2019 | Jiang ....................... H04L 63/083 |
| 10,599,832 B2 * | 3/2020 | Jakobsson .......... G01B 9/02044 |
| 2007/0006279 A1 * | 1/2007 | Brown ..................... G06F 21/31 726/1 |
| 2007/0250920 A1 * | 10/2007 | Lindsay ................. G07F 7/1025 726/7 |
| 2008/0066167 A1 * | 3/2008 | Andri ....................... G06F 21/31 726/5 |
| 2009/0006856 A1 * | 1/2009 | Abraham ................ G06F 21/55 713/183 |
| 2014/0026211 A1 * | 1/2014 | Nickell ................... G06F 21/46 726/18 |
| 2014/0137216 A1 * | 5/2014 | Mohler ..................... H04L 9/32 726/5 |
| 2014/0289870 A1 * | 9/2014 | Selander ................. G06F 21/46 726/28 |
| 2015/0074777 A1 * | 3/2015 | Stieglitz ................ H04L 63/083 726/7 |
| 2017/0083699 A1 * | 3/2017 | Zagorski ................. G06F 21/46 |
| 2017/0277885 A1 * | 9/2017 | Olivera ................... G06F 21/46 |
| 2018/0069843 A1 * | 3/2018 | Alarifi ................... H04L 9/3239 |
| 2018/0247044 A1 * | 8/2018 | Liu .......................... G06F 21/36 |
| 2020/0036705 A1 * | 1/2020 | Lee ......................... G06F 16/27 |
| 2021/0110013 A1 * | 4/2021 | Walters ................. G06F 21/316 |

* cited by examiner

*Primary Examiner* — James R Turchen
(74) *Attorney, Agent, or Firm* — D2 Worldwide LLC; Frank Liebenow

(57) ABSTRACT

A system for providing a password hint authenticates a username and password against a stored username and stored password. Upon failure of the authentication, the system determines a password formation rule that was in force when the user created the stored password then compares the password to the password formation rule and if the password violated any part of the password formation rule, the system reports each part of the password that violated the any part of the password formation rule.

20 Claims, 8 Drawing Sheets

SYSTEM, METHOD, AND APPARATUS FOR ASSISTING WITH PASSWORDS

FIELD

This invention relates to the field of user authentication and more particularly to a system for assisting users in remembering passwords.

BACKGROUND

Many software systems attempt to provide a secure computing environment. For many such systems, security is provided through what a user knows, typically a username and a password or pin. As greater security is desired, the length and complexity of each password is increased. For example, many systems required a minimum length password, require at lease one upper case letter and one lower case letter, require at least one special character (e.g., !#$%^&*( )[ ]), etc. Some systems don't allow repeated characters or words from the user's native language (e.g. "cat," "dog"). Further, for added security, many systems age passwords and, after a certain amount of time passes, upon login, the users are required to change their password.

All this complexity makes remembering passwords quite a feat, especially when a user has many different systems that they need to access such as work systems, banking systems, airline systems, email systems, content providing systems, etc. As password complexity increases, the probability of forgetting one's password also increases, leading to a user writing down their passwords which violates all good security measures.

Users typically use certain patterns or phrases to remember their passwords. For example, a user named John might use a password like John000!, maybe using a similar password across multiple systems (e.g., John111# on a different system). Even with such patterns, when this user creates a new password on a new system, the user might not be able to follow their desired pattern. For example, on the new system, the user might not be able to use a name (John) or might not be able to use three repeated characters (111), thereby creating a password that is not according to their usually style (e.g., "Jhn123#$). After not using the new system for a period of time, there is a high chance that this user will forget the password for this system, maybe trying one of their typical passwords such as John000! or John111# without success. After several attempts, this user will likely wind up with a locked account and need to make a phone call, which is inconvenient, takes time, and may be expensive if outside of their home country.

What is needed is a system that will help the user logging in by reminding the user what password rules are violated by the wrong password that was entered.

SUMMARY

In one embodiment, a system for providing password hints is disclosed including a computer that has a set of at least one password formation rule and a date on which each password formation rule in the set was placed into force. Software running on the computer causes the computer to accept a username and a password and causes the computer to authorize the username and password against a stored username and stored password. If the username and password fail authorization, the software causes the computer to select one password formation rule from the set of at least one password formation rule based upon a date of creation of the stored password and causes the computer to validate the password against the one password formation rule and if the password does not validate, the software causes the computer to generate an authorization failure message that includes details of why the password does not validate. Otherwise the software causes the computer to generate an invalid password message.

In another embodiment, a method of providing a password hint is disclosed including authenticating a username and password against a stored username and stored password. Upon failure of the authenticating, determining a password formation rule that was in force when the user created the stored password; comparing the password to the password formation rule and if the password violated any part of the password formation rule, reporting each part of the password that violated the any part of the password formation rule.

In another embodiment, program instructions tangibly embodied in a non-transitory storage medium for providing password hints at a computer are disclosed, wherein the at least one instruction includes computer readable instructions running on the computer that authenticate a username and password against a stored username and stored password. If the authentication passes, the computer readable instructions running on the computer allowing access to the computer. Otherwise, upon failure of the authentication, the computer readable instructions running on the computer determine a password formation rule that was in force when the user created the stored password; compare the password to the password formation rule that was in force when the user created the stored password, and if the password violated any part of the password formation rule, report each part of the password that violated the any part of the password formation rule. If the password did not violate any part of the password formation rule, the computer readable instructions running on the computer report an invalid password.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
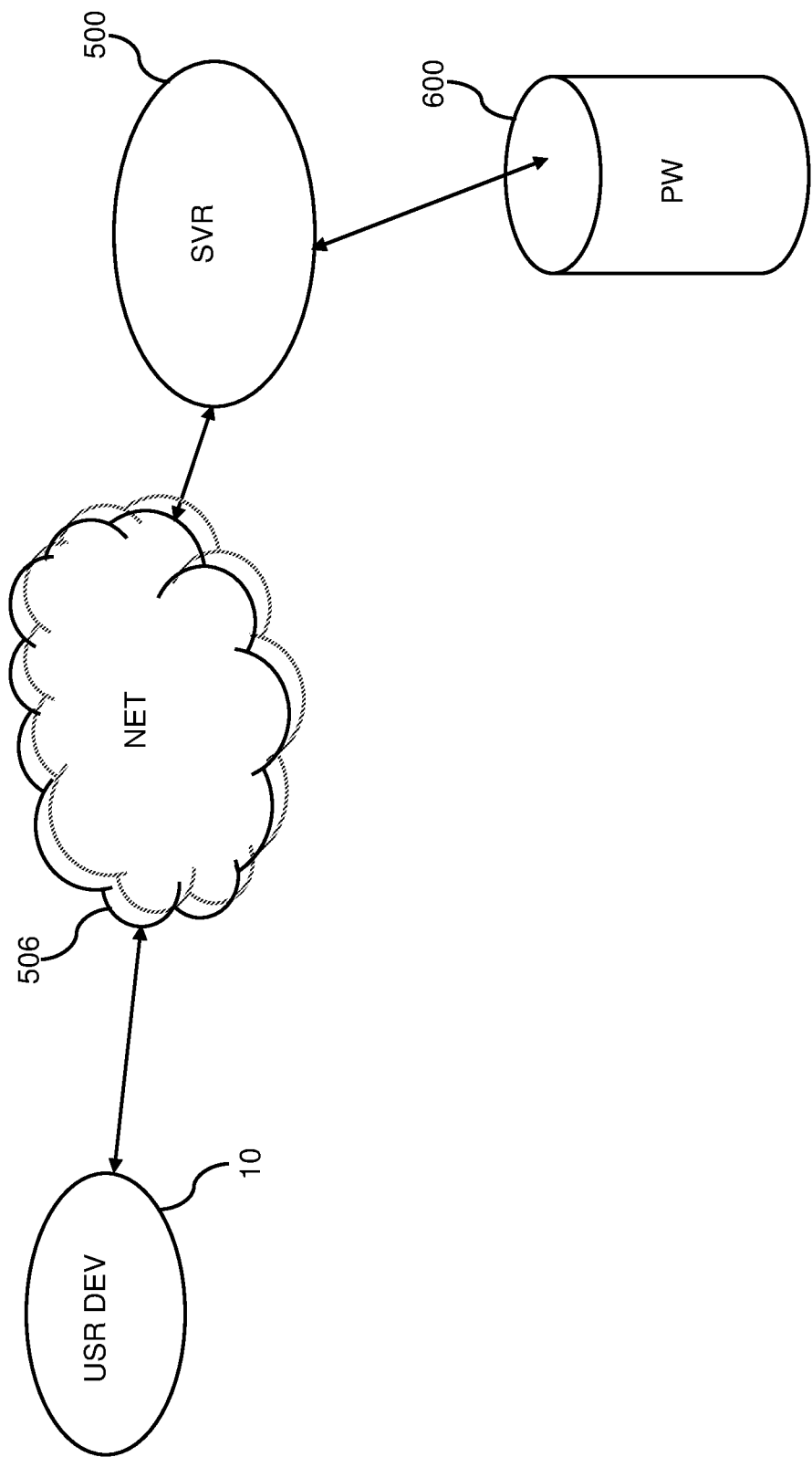
FIG. 1 illustrates a data connection diagram of the password hint system.

Reference will now be made in detail to the presently preferred embodiments of the invention, examples of which are illustrated in the accompanying drawings. Throughout the following detailed description, the same reference numerals refer to the same elements in all figures.

In general, the password hint system provides information regarding the attempted password after determining that the password is invalid. For example, if the authorization requires an eight-character password and the user enters a seven-character password, the password hint system provides a hint saying that the password entered was too short. In another example, if the authorization system forbids passwords that include names and the user enters a password that includes a name (e.g. "John111!"), the password hint system provides a hint that the password entered includes a name and shouldn't include a name.

Throughout this description, the term, "computer" refers to any system that has a processor and runs software. One example of such is a personal computer. Another example is a smartphone or tablet. The term, "user" refers to a human that has an interest in the computer, perhaps a user who is using the computer.

Throughout this description, the term, "password formation rule" refers to one or more restrictions (sub-rules) that are placed when formulating a password by a user. For example, a password formulation rule states that passwords must be at least eight characters long (first sub-rule) and have at least one special character (second sub-rule).

Referring to FIG. 1, a data connection diagram of the exemplary password hint system is shown. In this example, a user device 10 (e.g., personal computer, smartphone, tablet) communicates through a network 506 (e.g. the Internet, cellular network, local area network, etc.) to a server computer 500. In general, the server 500 provides a service to the user through the user device 10 such as banking information and access, content (e.g. video), workplace systems and data, catalogs and order processing, etc.

Figure 5:
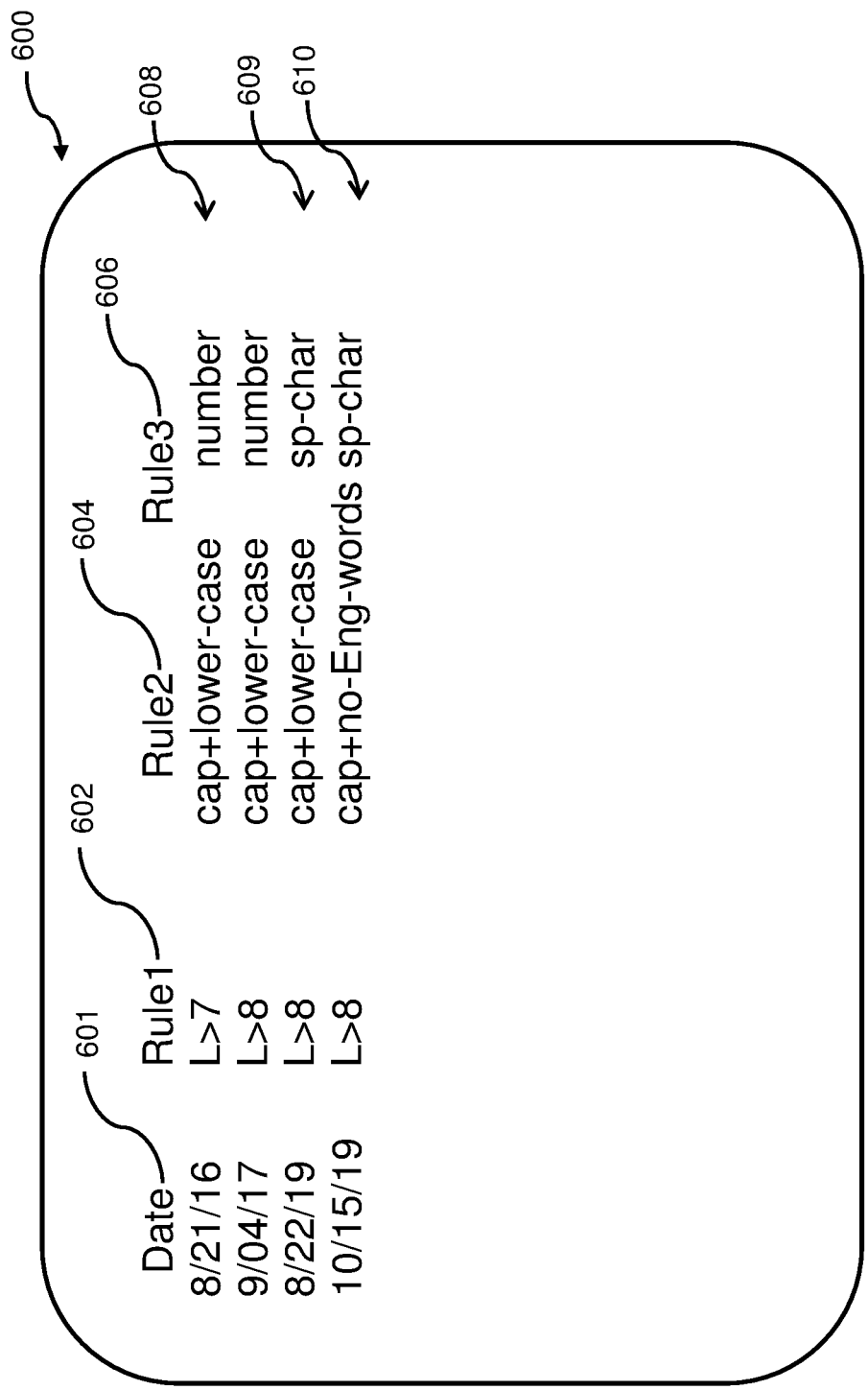
FIG. 5 illustrates a historic set of password rules for an exemplary system that a user desires to access.

The server computer 500 has access to data storage 600 for storing and maintaining passwords and historic password rules (see FIG. 5).

Although one path between the user device 10 and the server computer 500 is shown going through the network 506 as shown, any known data path is anticipated. For example, the Wi-Fi transceiver 96 (see FIG. 2) of the user device 10 is used to communicate with the wide area network 506, which includes the Internet, and, consequently, with the server computer 500.

The server computer 500 transacts with software running on the user device 10 through the network(s) 506. Although other forms of authentication are known and anticipated, many servers 500 require a username and password before access to data and services are provided by the servers 500.

Figure 2:
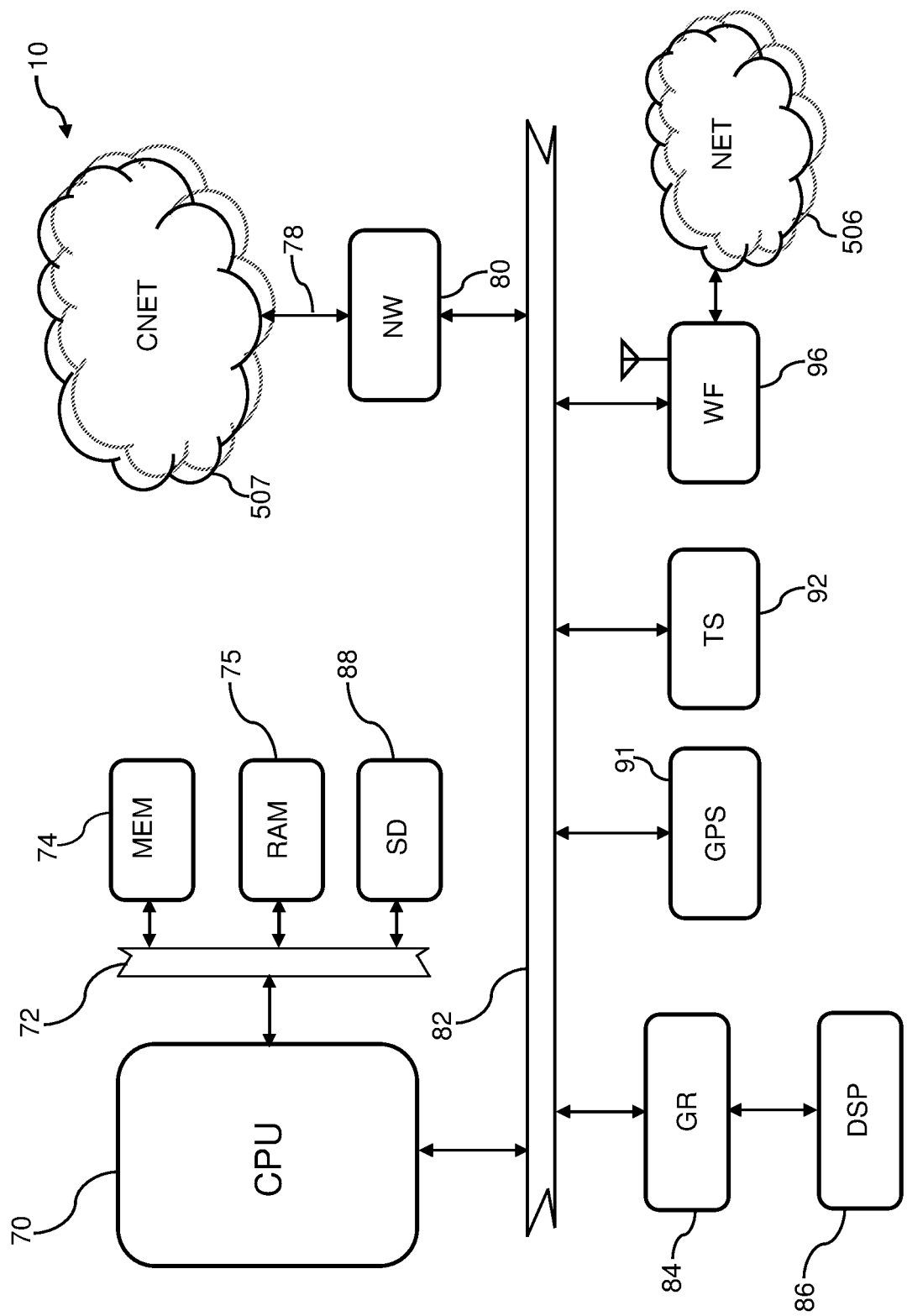
FIG. 2 illustrates a schematic view of a typical user device assisted by the password hint system.

Referring to FIG. 2, a schematic view of a typical user device 10 is shown. The user desiring access to data/services of the server 500 utilizes such a device 10. The present invention is in no way limited to any particular user device 10. Many user devices 10 that are processor-based devices are anticipated including, but not limited to smartphones, cellular phones, portable digital assistants, personal computers, smart watches, cordless phones, etc.

The example user device 10 represents a typical device used for accessing server systems 500. This exemplary user device 10 is shown in its simplest form. Different architectures are known that accomplish similar results in a similar fashion, and the present invention is not limited in any way to any particular user device 10 system architecture or implementation. In this exemplary user device 10, a processor 70 executes or runs programs in a random-access memory 75. The programs are generally stored within a persistent memory 74 and loaded into the random-access memory 75 when needed. In some user devices 10, a removable storage slot 88 (e.g., compact flash, SD) offers removable persistent storage. The processor 70 is any processor suitable for the user device 10. The persistent memory 74, random-access memory 75, and memory card 88 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, a hard disk, flash memory, read only memory, battery-backed memory, etc. In some exemplary user device 10, the persistent memory 74 is removable, in the form of a memory card of appropriate format such as SD (secure digital) cards, micro SD cards, compact flash, etc.

Also connected to the processor 70 is a system bus 82 for connecting to peripheral subsystems such as a cellular network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as Global Positioning Subsystems, speakers, microphones, USB interfaces, cameras, microphones, Bluetooth transceivers, Wi-Fi transceivers 96, image sensors, temperature sensors, etc., the details of which are not shown for brevity and clarity reasons.

In some embodiments of user devices 10, the cellular network interface 80 connects the user device 10 to the cellular network 507 through any known or future protocol such as GSM, TDMA, LTE, etc., or through wireless medium 78 (or via a land line over the "plain old telephone service, or POTS). There is no limitation on the type of connection used. The cellular network interface 80 provides data and voice connections through the cellular network 507.

Figure 3:
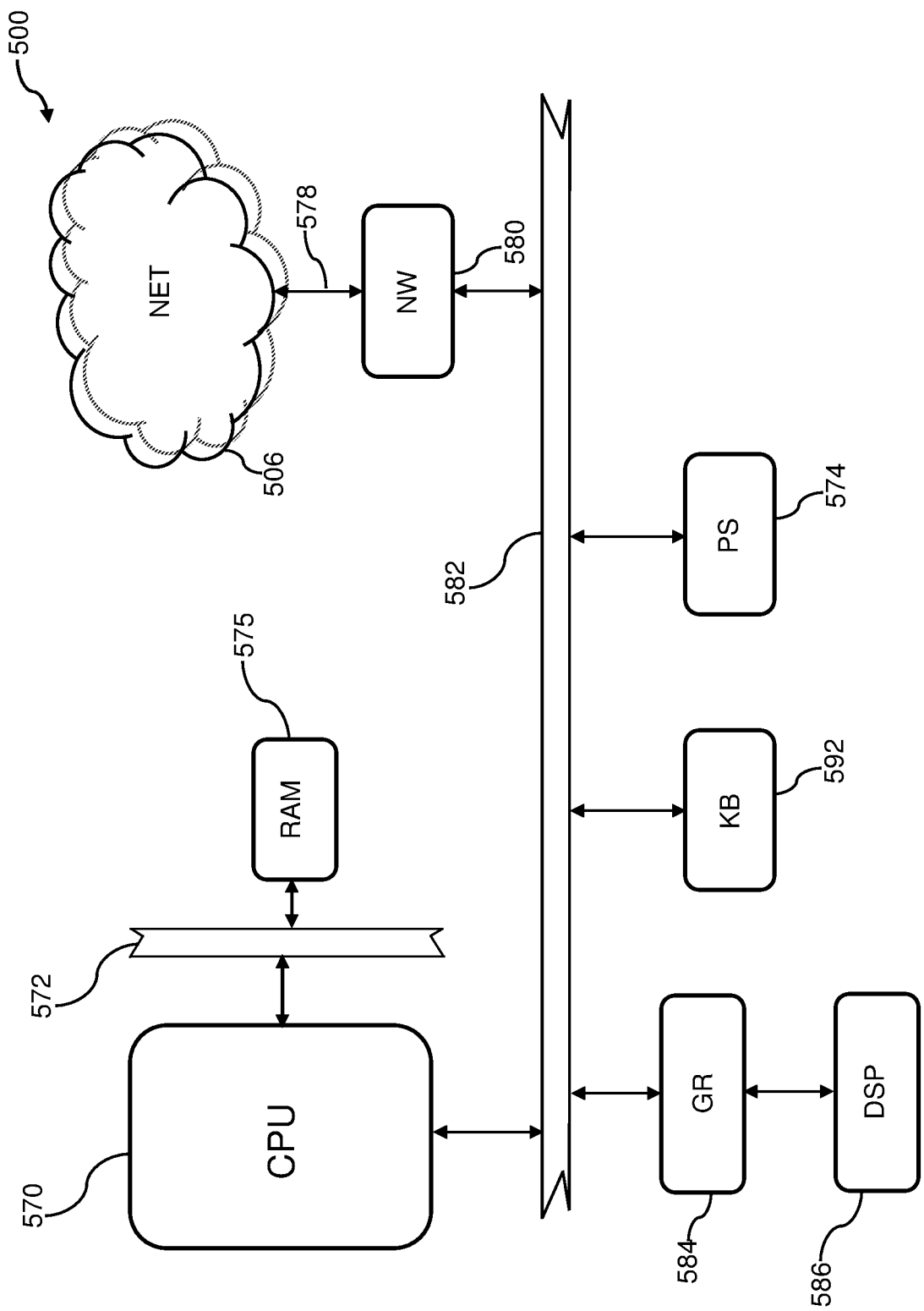
FIG. 3 illustrates a schematic view of a typical server computer system.

Referring to FIG. 3, a schematic view of a typical server computer system (e.g., server computer 500) is shown. The example server computer 500 represents a typical server computer system used for providing data and/or services, etc. For example, a server computer 500 that provides bank account access, travel account access, makes reservations, provides content such as music and video, etc.

This exemplary server computer 500 is shown in its simplest form. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent storage 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the selected processor 570, such as SRAM, DRAM, SDRAM, RDRAM, DDR, DDR-2, etc. The persistent storage 574 is any type, configuration, capacity of memory suitable for persistently storing data, for example, magnetic storage, flash memory, read only memory, battery-backed memory, magnetic memory, etc. The persistent storage 574 is typically interfaced to the processor 570 through a system bus 582, or any other interface as known in the industry.

Also shown connected to the processor 570 through the system bus 582 is a network interface 580 (e.g., for connecting to a data network 506), a graphics adapter 584 and a keyboard interface 592 (e.g., Universal Serial Bus—USB). The graphics adapter 584 receives commands from the processor 570 and controls what is depicted on a display 586. The keyboard interface 592 provides navigation, data entry, and selection features.

In general, some portion of the persistent storage 574 is used to store programs, executable code, data, content, and other data, etc.

The peripherals are examples and other devices are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
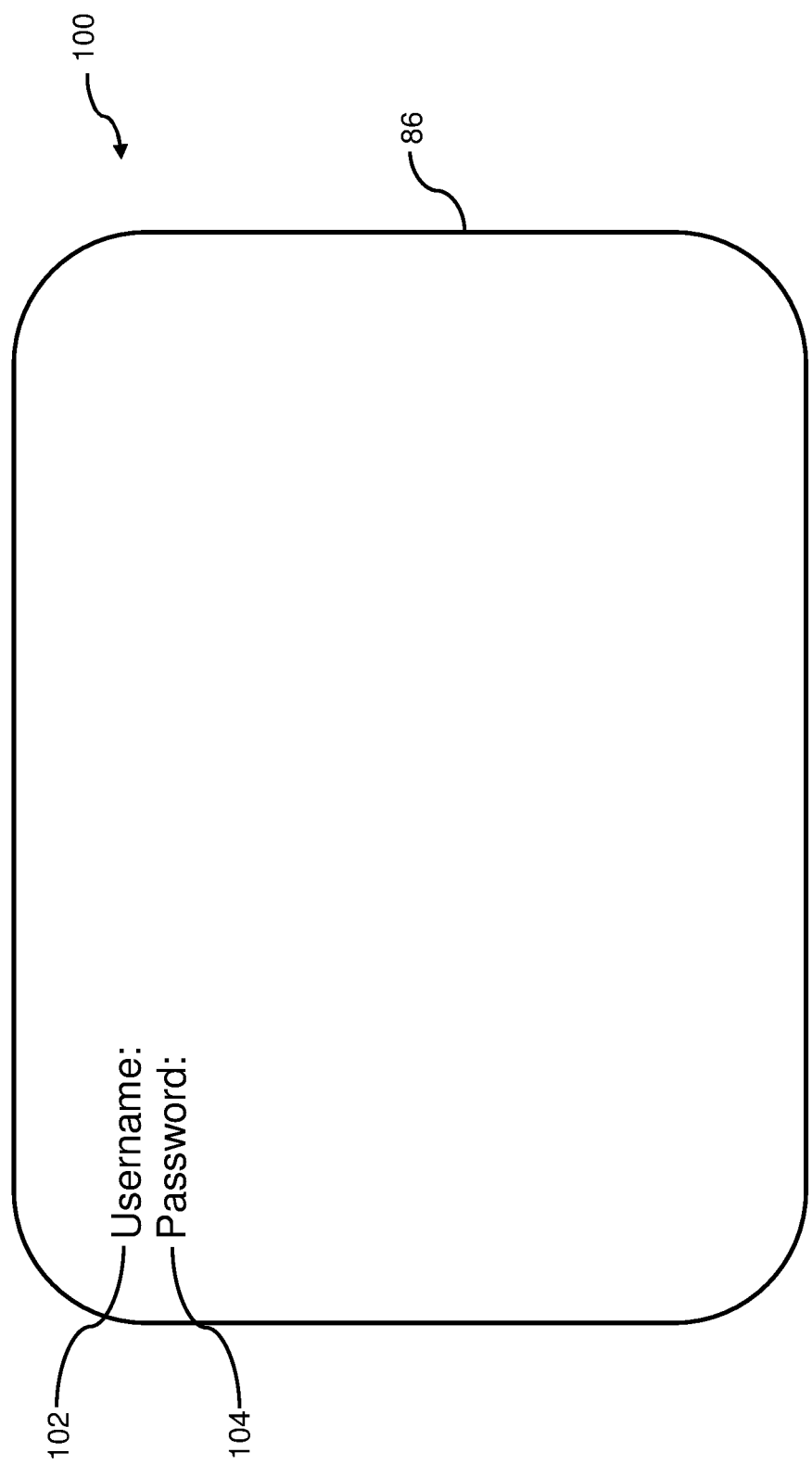
FIG. 4 illustrates a logon user interface of the typical user device assisted by the password hint system.

Referring to FIG. 4, a logon user interface 100 for accessing a server 500, including the password hint system is shown. Many people logon to a myriad of server systems 500 each day, checking email, bank account information, watching video, etc. In FIG. 4, an exemplary logon page 100 is displayed on the display 86 of the user device 10. The logon user interface requests that the user enter a username 102 and a password 104.

In the past, if the user forgot their password 104, the only feedback provided is that their password is incorrect. If the user has a regular pattern of passwords, this feedback does not help the user understand why their password 104 was incorrect. For example, if the user typically used two letters followed by 4 digits for their password (e.g. "AB1234") and the user enters "AB1234," feedback of "Invalid password" doesn't inform the user that, when their password was created, certain password formation rules were in force, such as requiring a lower-case letter and a capital letter. If the user understood this rule, the user might try "Ab1234" or "aB1234."

Referring to FIG. 5, a list 600 of previous and current password formation rules is shown. In this exemplary list 600 of previous and current password rules, there are four columns 601/602/604/606. There is a date column 601, for example, indicating the date that the associated row, or password formation rules (e.g. row 608) was first in force. There are sub-rule columns 602/604/606 indicating various sub-components of each password formation rule. For example, the first password formation rule 608 went in force on Aug. 21, 2016 and the first sub-rule (rule1 column 602) indicates that passwords must be greater than 7 characters in length. The second sub-rule (rule2 column 604) indicates that there must be one capital letter and one lower-case letter. The third sub-rule (rule3 column 606) indicates that there must be at least one number in each password. So, a password created between Aug. 21, 2016 and Sep. 4, 2017, has a password formation rule 608 that indicates the password must have at least seven characters, have one capital and one lower-case letter, and have at least one number (digit). As another example, the third password formation rule 609 requires passwords entered after Aug. 22, 2019 and before Oct. 15, 2019, be at least eight characters long, have a capital and a lower-case letter, and have at least one special character.

Note that only three columns of sub-rules 602/604/606 are shown, though any number of password formation of rules with any number of columns or sub-rules is anticipated. Further, any organization of password formation rules is anticipates such as regular expressions, English language rules, etc.

Figure 6:
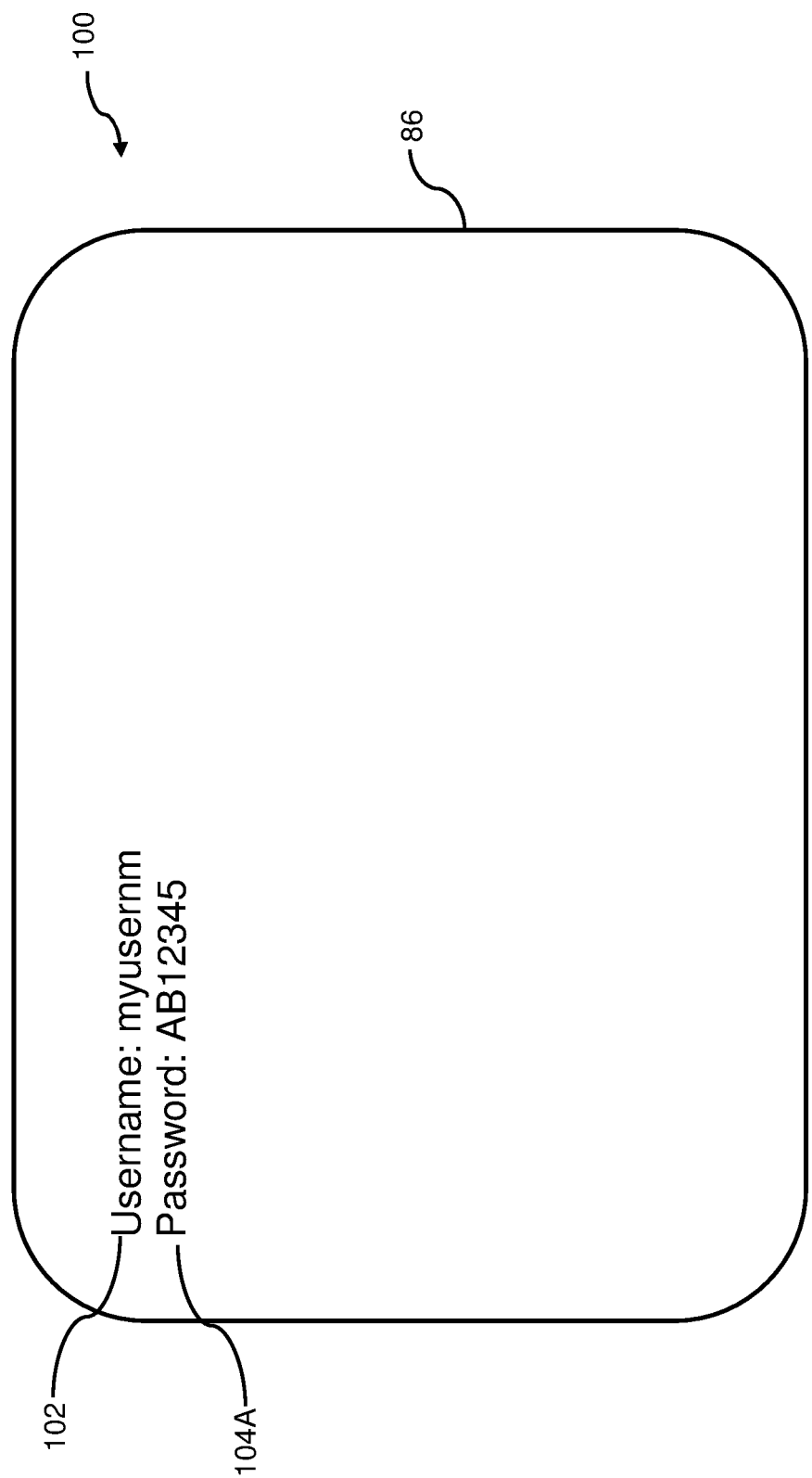
FIG. 6 illustrates a logon user interface of the typical user device assisted by the password hint system, including a password that was entered.
Figure 7:
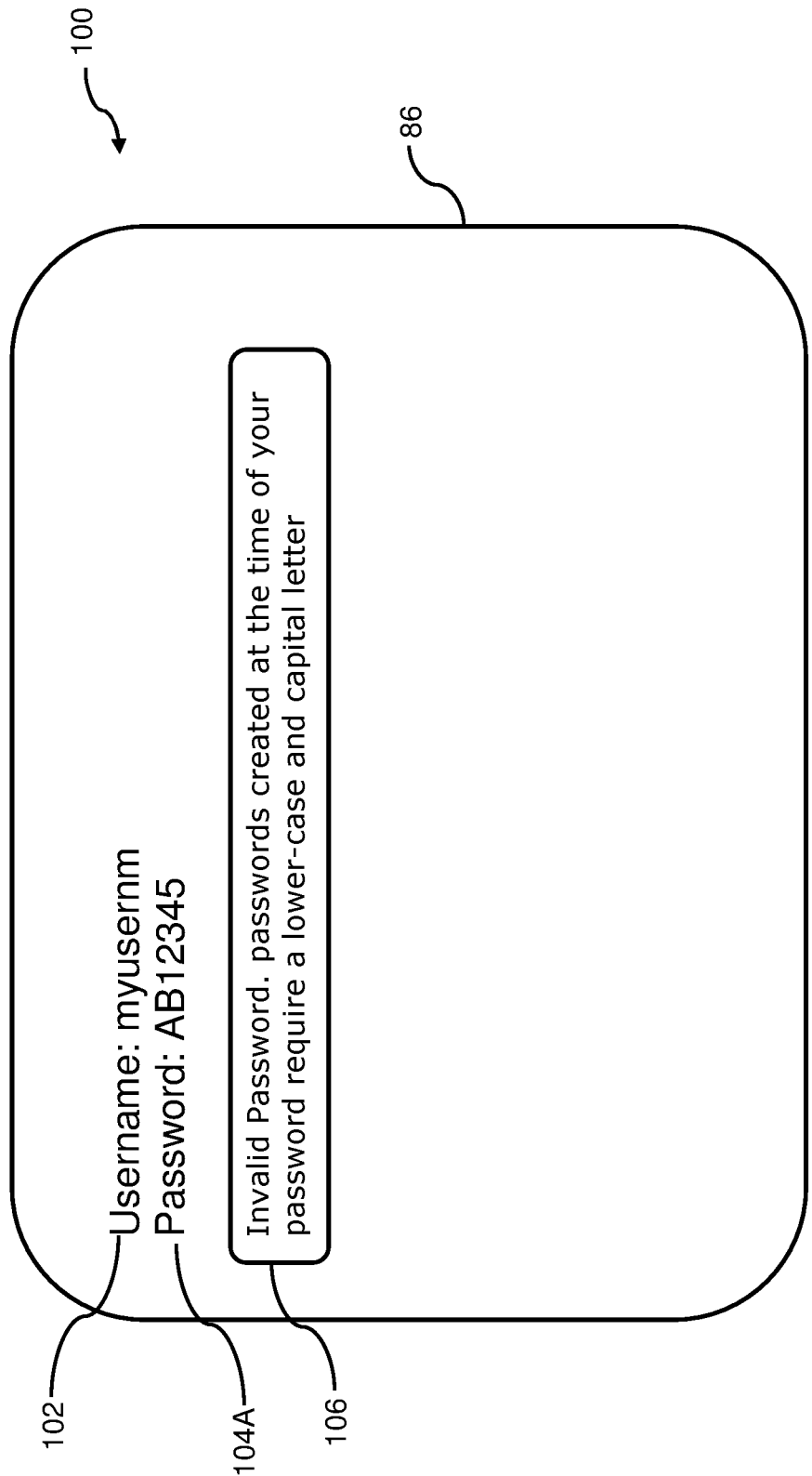
FIG. 7 illustrates a logon user interface of the typical user device assisted by the password hint system, including a hint as to why the entered password did not follow the rules that were in force when the user created the password.

Referring to FIG. 6, a logon user interface 100 for accessing a server 500, including the password hint system is shown. Many people logon to a myriad of server systems 500 each day, checking email, bank account information, watching video, etc. In FIG. 6, an exemplary logon page 100 is displayed on the display 86 of the user device 10. In this example, the user has entered a username 102 (e.g. "myusernm") and a password 104 ("AB12345").

In the past, if the user forgot their password 104A, the only feedback provided is that their password is incorrect. In the example of FIG. 6, the user has entered a seven-character password with two letters and five numbers/digits. Using the password formation rules of FIG. 5, if the user created this password between Aug. 21, 2016 and Sep. 4, 2017, feedback 106 informs the user that their password 104A is invalid and that when their password was created, a lower-case and capital letter were required. Knowing this, the user might try "Ab1234" or "aB1234."

On the other hand, if the user created this password between Sep. 4, 2017 and Aug. 22, 2019, feedback from the password hint system informs the user that, when their password was created, a lower-case and a capital letter were required and that the password must be at least eight characters in length. Knowing this, the user might try "Ab123456" or "aB123456." In this, the password hint system recognized that the user entered the seven required characters but had only upper-case letters whereas passwords created between Sep. 4, 2017 and Aug. 22, 2019 required an upper case and a lower-case letter, which was not found in the password 104A that was entered. Therefore, when the existing password checking system determined that the password 104A that was entered was invalid, the password hint system recognizes that the password was not validated and further analyzes the password formation rules that were in force when the password was created, reporting any violation of the rules that were in force. If the password 104A that was entered followed the rules in force at the time that the user created their password, only "invalid password" is reported since the user entered a password 104A that properly followed the password formation rules that were in place when the user's password was created, but did not enter the correct password. The password hint system requires keeping track of when (e.g. the date) the user created their password, which is usually maintained for password aging reasons (e.g. requesting that the user change their password after a certain period of time such as three months).

In some embodiments, the password hint system will call out specifically where in a password the problem occurred. For instance: if a password entered was "123cat" and the password formulation rule (e.g. rule 610 of FIG. 5) specified that common English words would not be allowed, then the password hint system will inform the user about such. For example, "when your password was created, common English words were not allowed in your password." In another example, if the password was "123!!cat" and the password hint system recognizes that at the time of creation of the user's password, certain special characters were not allowed, the password hint system outputs an informational message such as: "At the time your password was created, the special character '!' was not allowed." In this way, the user's typed-in password is not displayed (only the hint or part that was in violation of the password rule) should another be watching the user entering their password.

Therefore, if the user created this password between Aug. 22, 2019 and Oct. 15, 2019, feedback informs the user that, when their password was created, a lower-case and capital letter were required, that the password must be at least eight characters in length, and passwords require a special character. Knowing this, the user might try "Ab12345#" or "aB12345#."

In some embodiments, due to privacy, the informational messages 106 do not replicate the violation that is part of the password 104A entered by the user. For example, if the user was not allowed to use English words at the time the user created the password, instead of displaying an informational message such as "at the time your password was created, English words such as 'cat' were not allowed in your password," as this would show someone who might be standing behind the user part of the user's password 104A. Instead, the informational message 106 might simply state: "at the time your password was created, English words were not allowed in your password."

Figure 8:
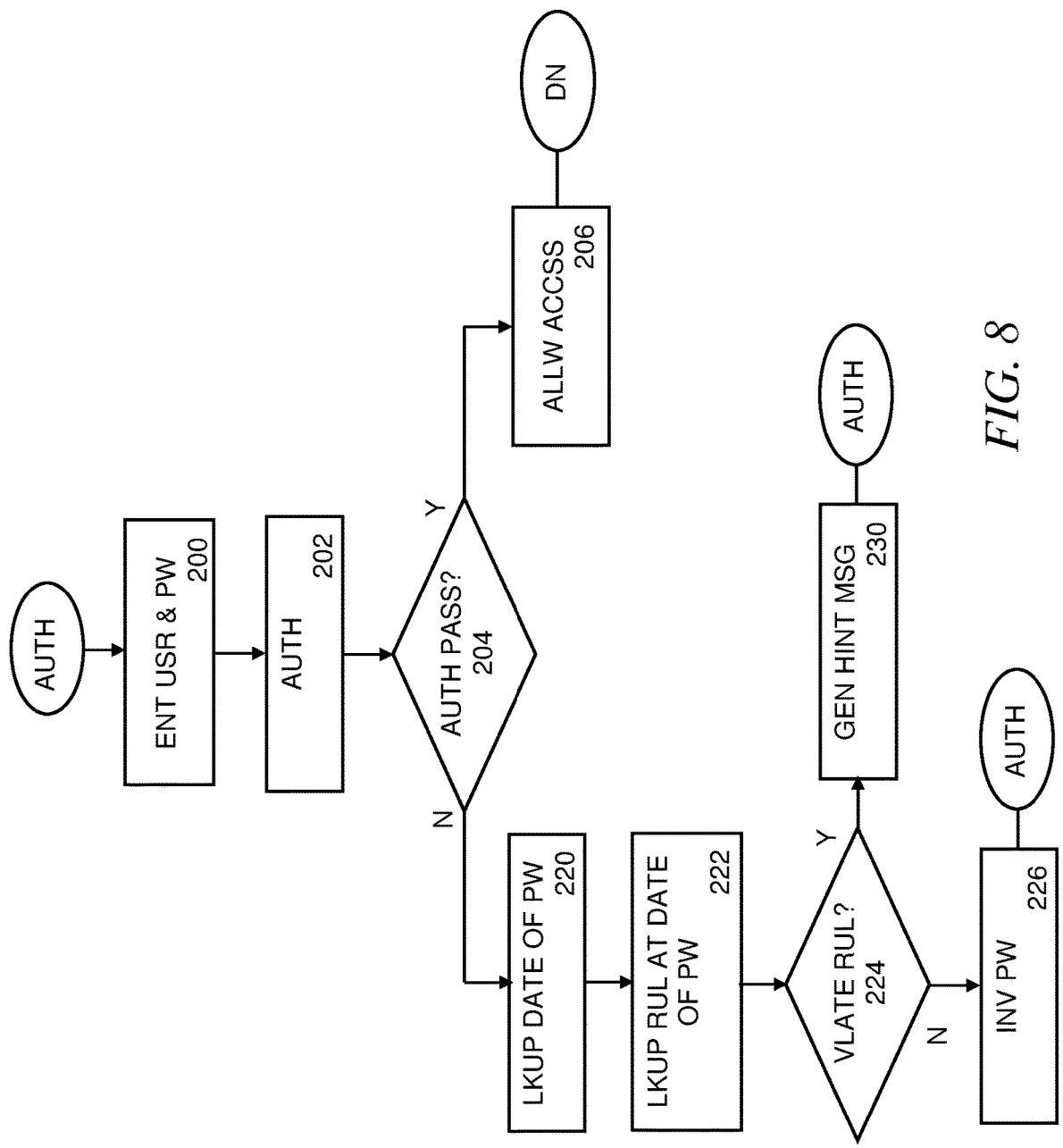
FIG. 8 illustrates an exemplary program flow of the password hint system.

Referring to FIG. 8, an exemplary program flow of the password hint system is shown. The password hint system initially requests 200 the username 102 and password 104 of the user, as done in the past.

Next, the username 102 and password 104 are authenticated 202 as done in the past using any known or future authentication mechanism. Next, if authentication passes 204, the user is allowed access 206.

If authentication does not pass 204, the date that the user created the password is retrieved 220, then the password formation rules that were in force at the date that the user created the password are retrieved 222. Now the password 104 that was entered is tested per the password formation rules that were in force at the time that the user created the password are used to test the password 104 for any violations of such rules. If the password 104 that was entered does not violate 224 the password formation rules, a standard invalid password 226 message is emitted/displayed and the authentication process is repeated (e.g. looking for the user to enter a correct password).

If the password 104 that was entered does violate 224 any of the sub-rules of the password formation rule that was in force at the time that the user created the password, a hint message is generated 230 and displayed. For example, "the password entered includes an English word," or "the password entered includes a special character that was not allowed at the time your password was created."

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for providing password hints, the system comprising:
   a computer, the computer having a set of at least one password formation rule and a date on which each password formation rule was placed into force;
   software running on the computer causing the computer to accept a username and a password, the software further causing the computer to authorize the username and password against a stored username and stored password; and
   if the username and password fail authorization, the software causing the computer to select one password formation rule from the set of at least one password formation rules based upon a date of creation of the stored password and causing the computer to validate the password against the one password formation rule and if the password does not validate, the software causes the computer to generate an authorization failure message that includes details of why the password does not validate; otherwise the software causes the computer to generate an invalid password message.

2. The system of claim 1, wherein the authorization failure message includes portions of the password that caused the password to not validate.

3. The system of claim 1, wherein the authorization failure message includes a description of at least one part of the one password formation rule that did not validate.

4. The system of claim 3, wherein the description comprises a password length violation.

5. The system of claim 3, wherein the description comprises a missing upper-case letter in the password.

6. The system of claim 3, wherein the description comprises a missing lower-case letter in the password.

7. The system of claim 3, wherein the description comprises a missing number in the password.

8. The system of claim 3, wherein the description comprises a missing special character in the password.

9. The system of claim 3, wherein the description comprises a special character that is not permitted in the password.

10. The system of claim 3, wherein the description comprises a non-allowed English word in the password.

11. A method of providing a password hint to a user of a computer, the method comprising:
    authenticating a username and password against a stored username and stored password;
    upon failure of the authenticating, determining a password formation rule that was in force when the user created the stored password;
    comparing the password to the password formation rule and if the password violated any part of the password formation rule, reporting each part of the password that violated the any part of the password rule; and
    if the password did not violate any part of the password formation rule, reporting an invalid password.

12. The method of claim 11, wherein the step of comparing comprises retrieving the password formation rule from a set of password formation rules in which each of the set of password formation rules comprises a date in which a corresponding password formation rule came into force using a date in which the stored password was created.

13. The method of claim 11, wherein the reporting comprises a message informing the user which part of the password violated the password formation rule.

14. Program instructions tangibly embodied in a non-transitory storage medium for providing password hints at a computer, wherein the at least one instruction comprises:
- computer readable instructions running on the computer authenticating a username and password against a stored username and stored password;
- if the authenticating passes, the computer readable instructions running on the computer allowing access to the computer;
- otherwise, upon failure of the authenticating, the computer readable instructions running on the computer determining a password formation rule that was in force when the user created the stored password; comparing the password to the password formation rule that was in force when the user created the stored password, and if the password violated any part of the password formation rule, reporting each part of the password that violated the any part of the password formation rule; and
- if the password did not violate any part of the password formation rule, the computer readable instructions running on the computer reporting an invalid password.

15. The program instructions tangibly embodied in the non-transitory storage medium of claim 14, wherein the computer readable instructions running on the computer performing the step of comparing comprises the computer readable instructions running on the computer retrieving the password formation rule from a set of password rules in which each of the set of password formation rules comprises a date in which a corresponding password formation rule came into force using a date in which the stored password was created.

16. The program instructions tangibly embodied in the non-transitory storage medium of claim 14, wherein the computer readable instructions running on the server for reporting each part of the password rule that violated the any part of the password formation rule, reporting includes a description of at least one part of the one password rule that did not validate.

17. The program instructions tangibly embodied in the non-transitory storage medium of claim 16, wherein the description comprises a password length violation.

18. The program instructions tangibly embodied in the non-transitory storage medium of claim 16, wherein the description comprises a missing upper-case letter in the password.

19. The program instructions tangibly embodied in the non-transitory storage medium of claim 16, wherein the description comprises a missing lower-case letter in the password.

20. The program instructions tangibly embodied in the non-transitory storage medium of claim 16, wherein the description comprises a missing special character in the password.

\* \* \* \* \*